Patented July 19, 1932

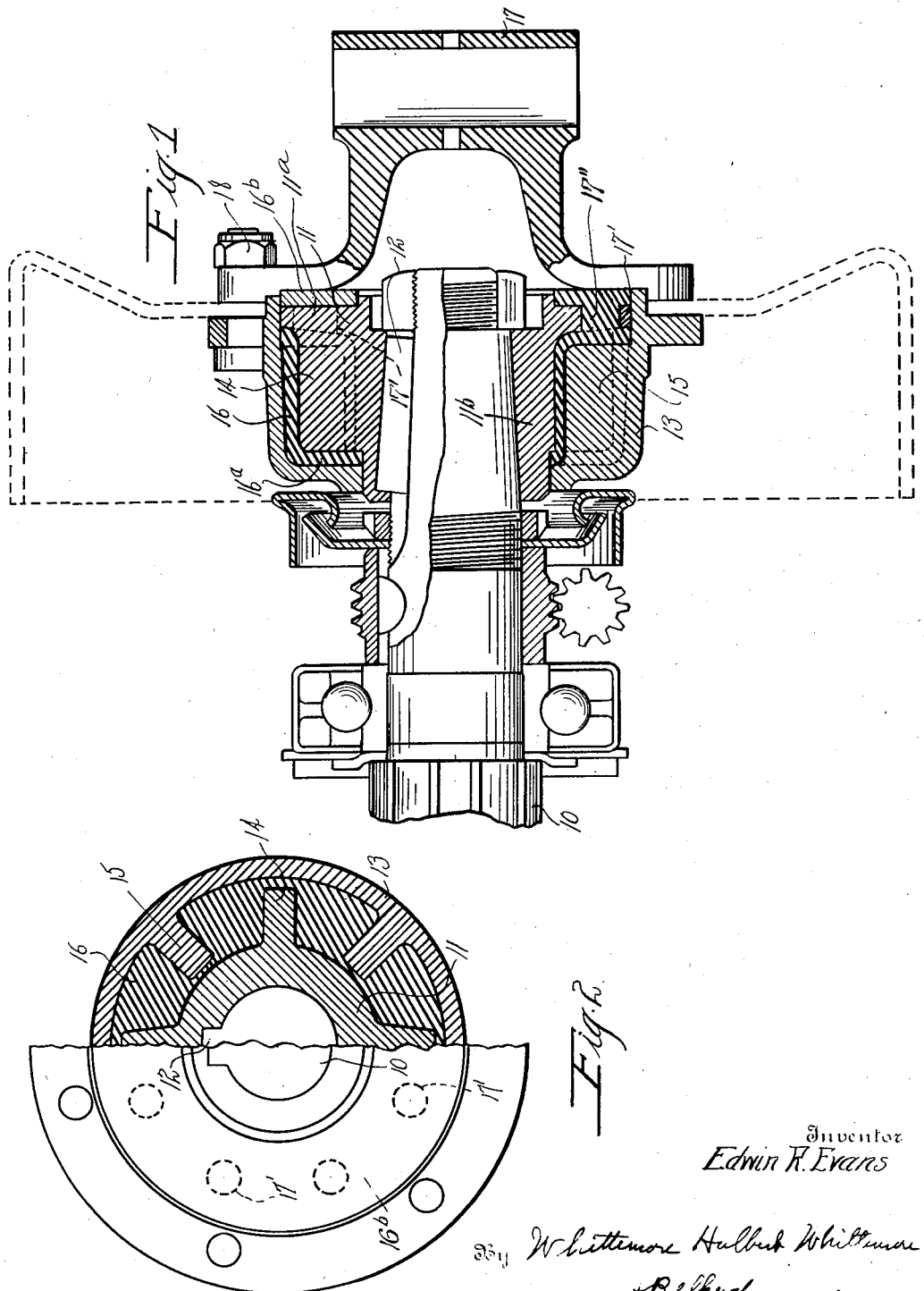

1,868,163

UNITED STATES PATENT OFFICE

EDWIN R. EVANS, OF DETROIT, MICHIGAN

SHOCK INSULATING DEVICE

Application filed August 24, 1925. Serial No. 52,183.

The invention relates to shock insulating devices and refers more particularly to means for eliminating shocks or vibrations in motor vehicles.

One of the objects of the invention is to eliminate the vibrations and shocks which tend to be transmitted from the back axle and road wheels of a motor vehicle. Such vibrations tend to create noises and shocks in the operating parts of the car such, for example, as in the transmission and clutch, which noises are very disagreeable in a smooth running car.

With these and other objects in view, the invention resides in the novel features of construction and combination and arrangements of parts as more fully hereinafter described and claimed.

Referring to the drawing in which like reference characters indicate corresponding parts, Figure 1 is a sectional view in elevation showing one form of my invention in which the shock absorbing device is located between the transmission spline shaft and the front universal joint connection; and Figure 2 is an elevation view showing the driving and driven parts in their assembled condition, a portion of the parts being broken away.

In the drawing, reference character 10 represents the transmission spline shaft which, in accordance with standard practice may be driven from the usual engine and transmission gearing (not shown). 11 represents the inner hub or driving member having the annular base portion 11ª and the hub portion 11ᵇ keyed at 12 to the transmission shaft 10. 13 represents a driven casing member or front universal joint flange. The driving member 11 and the driven member 13 are preferably provided with the circumferentially spaced radial lugs 14 and 15 respectively, the lugs of one member extending into the recess formed by the adjacent lugs of the other member as will be noted from Figure 2. In order to form a resilient driving connection between the members 11 and 13, I preferably fill the spaces between the lugs 14 and 15 with a resilient member or substance 16 preferably in the nature of a solid rubber-like material.

17 represents the front universal joint connection which in accordance with the standard practice, is adapted to drive a propeller shaft, (not shown) which transmits power to the rear driving wheels of the vehicle. In order to absorb shocks and vibrations transmitted axially of the propeller shaft or transmission shaft 10, I preferably also extend the rubber-like material 16 around the front and rear faces of the members 11 and 13 as indicated at 16ª and 16ᵇ respectively. The annular base portion 11ª of the driving member 11 is further preferably provided with a circumferential series of openings 17' through which the rubber-like material extends, as indicated at 17'', the said rubber-like material spreading out after passing through the said openings to form the portion 16ᵇ. The material 16 is in this manner substantially fixed relative to the member 11, and since the material 16 positions the member 13 with respect to the member 11, it serves to maintain the members 11 and 13 in their proper positions with respect to relative rotation. I have found it desirable to allow from two to five thousandths of an inch loose fit between the portions 17'' of the rubber-like material and the inner peripheries of the openings 17', it being discovered that rubber under pressure will fill this small clearance resulting in a thin film of rubber which will dampen small shocks between these surfaces. Bolts 18 are adapted to rigidly connect the universal member 17 with the driven member 13.

From the foregoing construction it will be noted that in the ordinary use of the parts the drive from the engine will be transmitted from the transmission shaft 10 and the driving member 11 through the resilient material 16 to the driven member 13 whence the drive passes through the universal joint connection 17 to the usual propeller shaft and rear wheels. Whenever there is a tendency for shocks and vibrations it will be transmitted from the rear axle or rear wheels back through the propeller shaft and driving mechanism, such shocks or vibration will be absorbed by reason of the resilient material 16 and will thus be prevented from reaching the transmission clutch and other parts of the engine. It is obvious that instead of locating the resilient driving connection between the transmission shaft and the front universal joint connection as shown, I could also place this resilient connection at other parts of the drive as might be found convenient.

When the rear springs of the vehicle function, as for example when the vehicle encounters an obstruction, in the road the propeller shaft has a tendency to shorten and lengthen. A splined section on the front propeller shaft joint is usually provided to receive an external spline section on the propeller shaft proper with a view of compensating for this shortening and lengthening of the propeller shaft. Nevertheless, it has been found that the splined sections do not entirely compensate for the axial movement of the propeller shaft and a further feature of my invention resides in eliminating or absorbing the shocks and vibrations of this character. Thus, as will be noted in Figure 1, the portions 16ª and 16ᵇ of the resilient material will serve to eliminate shocks or vibrations of this character.

If desired the rubber-like substance 16 may be molded directly into the casing provided by the members 11 and 13 or may be molded without the casing and assembled therein in sections.

While it is believed from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. A shock insulating device for use in absorbing shocks or vibrations transmitted from the ground wheels of a motor vehicle through the propeller shaft comprising a hub member adapted to be driven by the vehicle engine the said hub member having an annular portion provided with a series of openings, and a casing member adapted to be driven by the hub member, said members being formed with circumferentially overlapping lugs, and a yielding material between the lugs and extending through the said openings and forming the driving medium between said members.

2. In a vehicle, the combination with a driving and a driven shaft, of a member keyed to the driving shaft, said member having an annular base portion and a hub portion provided with radially extending lugs, the said annular base portion being provided with a series of openings, a casing member fixed for rotation with the driven shaft and substantially enclosing the said first mentioned member, radially extending lugs carried by the said casing member in interfering position with the lugs on the hub member, and resilient material within the said casing member, the said resilient material completely surrounding the said lugs and projecting through the openings in the annular base portion of the first mentioned member.

3. In a vehicle, the combination with a driving and a driven shaft, of a hub member keyed to the driving shaft, the said hub member being provided with a plurality of radially extending lugs and with an annular base portion having a series of openings, a yieldable material surrounding the ends and the sides of the said lugs and extending through the openings in the base of the hub member to form a cushion adjacent the said lugs and exteriorly of the said base portion, and a casing member secured to the driven shaft and substantially enclosing the said hub member, the said casing member having lugs engageable through the yieldable material with the lugs on the hub member.

4. In a shock insulating device, the combination with a driving shaft and a driven shaft, of a hub member keyed to the driving shaft, the said hub member having a flange provided with a plurality of openings, a casing member secured to the driven shaft and adapted to be driven by the said hub member, a yieldable material cushioning the driving connection between the hub member and the casing member, and means for securing the yieldable material to the hub member, said means including a plurality of reduced portions formed on the said yieldable material and engaging the said openings.

5. In a shock insulating device, the combination with a driving element having a hub member keyed thereto, of a plurality of lugs extending radially from the said hub member, a yieldable material surrounding the said lugs and projecting beyond one end of the said hub member to form an annular cushion thereagainst, a driven element having arms bearing against the said annular cushion, and a casing member secured to the said driven element, and having lugs engaging the lugs on the hub member through the said yieldable material.

6. A shock insulating device for use in absorbing shocks or vibrations transmitted from the ground wheels of a motor vehicle through the propeller shaft, including a hub member adapted to be driven by the vehicle engine and embodying an annular base portion, a casing member adapted to be driven by the hub member and embodying an annular base portion radially spaced from the annular base portion of the hub member, axially extending lugs projecting from the base portions of said members with the lugs on one member intermediate the lugs on the other member, the ends of the lugs on each of said members terminating in spaced relation with the base portion of the other of the members, and a yielding rubber-like substance completely filling the space between the said lugs and the space between the ends of the lugs and said base portions and forming the driving medium between said members, said yielding rubber-like substance being free from strain except during relative movement between said members.

7. A shock insulating device including in combination a plurality of members having lugs adapted to be arranged in interfering position with respect to each other, and a rubber-like substance arranged between the said members, the said rubber-like substance completely covering the sides and ends of the said lugs whereby all rotational and axial shocks tending to be transmitted from one member to the other will be absorbed by the said rubber-like substance, said rubber like substance being free from strain except when one of said members is moved relative to the other of said members.

8. A shock insulating device including in combination, a member having a plurality of lugs, a second member having lugs arranged between the lugs on the first mentioned member and in spaced relation to the same, and a rubber-like substance between the said members and cured in position and completely filling the space between said members and being free from strain except during relative movement between said members.

9. A shock insulating device including in combination a hub member having an annular portion provided with passages, a casing member adapted to be driven by the hub member, said members being formed with circumferentially overlapping lugs, and a yielding material between the lugs and extending through the said passages and forming a driving connection between said members.

10. A shock insulating device including in combination a driven casing member having a reduced opening at its one end and an enlarged opening at its other end, a driving hub member having a reduced portion adapted for bearing engagement in the reduced opening in said casing member and having an enlarged portion adapted for bearing engagement in the enlarged opening in said casing member, said members being provided with circumferentially overlapping lugs, and a yielding rubber like substance between the said lugs and forming the driving medium between said members.

11. A shock insulating device for use in absorbing shocks or vibrations transmitted in the driving devices of a motor vehicle, including a hub member adapted to be driven by the vehicle engine and embodying an annular base portion, a casing member adapted to be driven by the hub member and embodying an annular base portion axially spaced from the annular base portion of the hub member, the base of the hub member fitting in and closing one end of the casing member and the base of the casing member fitting on the hub member, axially extending lugs projecting from the base portions of said members with the lugs on one member intermediate the lugs on the other member, the lugs on each member being spaced radially from the other member and the ends of the lugs on each member terminating in spaced relation with the base portion of the other member, and a yielding rubber-like substance completely filling and confined in the space between said lugs and the space between the ends of the lugs and said base portions and forming the driving medium between said members, said yielding rubber-like substance being free from strain except during relative movement between said members.

12. A shock insulating device including in combination, a member having a plurality of lugs, a second member having lugs arranged between the lugs on the first mentioned member and in spaced relation to the same, and a rubber-like substance completely enclosed by, and completely filling the space between, said members and being free from strain except during relative movement between said members.

In testimony whereof I affix my signature.
EDWIN R. EVANS.